United States Patent
Shetty et al.

(10) Patent No.: US 10,969,405 B2
(45) Date of Patent: Apr. 6, 2021

(54) METHOD AND APPARATUS FOR SUB-DIFFRACTION INFRARED IMAGING AND SPECTROSCOPY AND COMPLEMENTARY TECHNIQUES

(71) Applicant: Photothermal Spectroscopy Corp., Santa Barbara, CA (US)

(72) Inventors: Roshan Shetty, Westlake Village, CA (US); Kevin Kjoller, Santa Barbara, CA (US); Craig Prater, Santa Barbara, CA (US)

(73) Assignee: Photothermal Spectroscopy Corp., Santa Barbara, CA (US)

( * ) Notice: Subject to any disclaimer, the term of this patent is extended or adjusted under 35 U.S.C. 154(b) by 0 days.

(21) Appl. No.: 15/826,147

(22) Filed: Nov. 29, 2017

(65) Prior Publication Data
US 2018/0180642 A1    Jun. 28, 2018

Related U.S. Application Data

(60) Provisional application No. 62/427,671, filed on Nov. 29, 2016.

(51) Int. Cl.
*G01N 21/17* (2006.01)
*G01N 21/31* (2006.01)
(Continued)

(52) U.S. Cl.
CPC ....... *G01Q 30/025* (2013.01); *G01N 21/1717* (2013.01); *G01N 21/31* (2013.01);
(Continued)

(58) Field of Classification Search
CPC ............... G01N 21/17; G01N 21/1717; G01N 21/1765; G01N 21/178; G01N 21/31; G01N 21/3563; G01N 21/65
See application file for complete search history.

(56) References Cited

U.S. PATENT DOCUMENTS 2,940,355 A    6/1960  Cary
7,630,081 B2  12/2009  Ressler et al.
(Continued)

FOREIGN PATENT DOCUMENTS

CN        105699358 A    6/2016
DE        102014108424 B3  6/2015
WO    WO 2013/078471 A1  5/2013

OTHER PUBLICATIONS

International Search Report and Written Opinion, Application No. PCT/US17/63810, dated Mar. 6, 2018, 4 pages.
(Continued)

*Primary Examiner* — Eliza W Osenbaugh-Stewart
(74) *Attorney, Agent, or Firm* — Patterson Thuente Pedersen, P.A.

(57) ABSTRACT

Methods and apparatus for performing chemical spectroscopy on samples from the scale of nanometers to millimeters or more with a multifunctional platform combining analytical and imaging techniques including atomic force microscopy, infrared spectroscopy, confocal microscopy, Raman spectroscopy and mass spectrometry. For infrared spectroscopy, a sample is illuminated with infrared light and the resulting sample distortion is read out with either a focused UV/visible light beam and/or AFM tip. Using the AFM tip or the UV/visible light beam it is possible to measure the IR absorption characteristics of a sample with spatial resolution ranging from around 1 µm or less to the nanometer scale. The combination of both techniques provides a rapid and large area survey scan with the UV/visible light and a high resolution measurement with the AFM tip. The methods and apparatus also include the ability to analyze light reflected/scattered from the sample via a Raman spectrometer for complementary analysis by Raman spectroscopy. Using a UV/vis source or IR source at higher intensity it is possible to thermally desorb material from a sample for analysis by
(Continued)

mass spectrometry. The AFM tip can also be heated to desorb material for mass spec analysis at even higher spatial resolution.

16 Claims, 9 Drawing Sheets

(51) Int. Cl.
    *G01N 21/65*     (2006.01)
    *G01Q 30/02*     (2010.01)
    *G01N 21/3563*     (2014.01)

(52) U.S. Cl.
    CPC ......... *G01N 21/3563* (2013.01); *G01Q 30/02* (2013.01); *G01N 21/65* (2013.01); *G01N 2021/1725* (2013.01)

(56) References Cited

U.S. PATENT DOCUMENTS

| | | |
|---|---|---|
| 7,855,780 B1 | 12/2010 | Djeu |
| 8,001,830 B2 | 8/2011 | Dazzi |
| 8,242,448 B2 | 8/2012 | Prater |
| 8,402,819 B2 | 3/2013 | Dazzi |
| 8,607,622 B2 | 12/2013 | Dazzi |
| 8,646,319 B2 | 2/2014 | Prater |
| 8,680,457 B2 | 3/2014 | Maxik |
| 8,793,811 B1 | 7/2014 | Prater |
| 8,869,602 B2 | 10/2014 | Belkin |
| 9,046,492 B1 | 6/2015 | Prater |
| 9,091,594 B2 | 7/2015 | Furstenberg |
| 9,134,341 B2 | 9/2015 | Prater |
| 9,250,061 B2 | 2/2016 | Lorbeer et al. |
| 9,372,154 B2 | 6/2016 | Prater |
| 9,658,247 B2 | 5/2017 | Yang et al. |
| 10,228,388 B2 | 3/2019 | Prater et al. |
| 10,228,389 B2 | 3/2019 | Yang et al. |
| 10,241,131 B2 | 3/2019 | Prater |
| 10,473,693 B2 | 11/2019 | Yang et al. |
| 2002/0105641 A1 | 8/2002 | Anderson |
| 2004/0085540 A1 | 5/2004 | Lapoko et al. |
| 2005/0105099 A1 | 5/2005 | Shpantzer |
| 2008/0304046 A1* | 12/2008 | Lee .................. G01N 21/1717 356/51 |
| 2009/0236528 A1 | 9/2009 | Shpantzer et al. |
| 2009/0249521 A1 | 10/2009 | Dazzi |
| 2010/0044570 A1* | 2/2010 | McGill .................. G01N 21/71 250/338.5 |
| 2010/0320171 A1 | 12/2010 | Mao |
| 2011/0248166 A1* | 10/2011 | Diem ................ H01L 27/14649 250/330 |
| 2012/0002030 A1 | 1/2012 | Kalkbrenner et al. |
| 2012/0122084 A1 | 5/2012 | Wagner et al. |
| 2012/0167261 A1 | 6/2012 | Belkin |
| 2012/0314206 A1 | 12/2012 | Spizig |
| 2013/0134310 A1 | 5/2013 | Furstenberg |
| 2014/0289912 A1 | 9/2014 | Andreev |
| 2014/0361150 A1 | 12/2014 | Cheng et al. |
| 2015/0085098 A1 | 3/2015 | Dowaki et al. |
| 2015/0308947 A1 | 10/2015 | Xu |
| 2016/0011049 A1 | 1/2016 | Furstenberg et al. |
| 2017/0127983 A1 | 5/2017 | Spegazzini et al. |
| 2017/0146455 A1 | 5/2017 | Mantele et al. |
| 2018/0052186 A1 | 2/2018 | Su et al. |
| 2018/0088041 A1* | 3/2018 | Zhang ..................... C12Q 1/02 |
| 2018/0259553 A1 | 9/2018 | Yang et al. |
| 2019/0120753 A1 | 4/2019 | Prater et al. |
| 2019/0204230 A1 | 7/2019 | Ota |
| 2020/0025677 A1 | 1/2020 | Prater et al. |

OTHER PUBLICATIONS

International Search Report and Written Opinion, Application No. PCT/US17/63807, dated Apr. 25, 2018, 11 pages.
International Search Report and Written Opinion, Application No. PCT/US18/21814, dated May 21, 2018, 8 pages.
University of New Mexico, *Helium Neon Laser*, available at http://www.phys.unm.edu/msbahae/Optics%20Lab/HeNe%20Laser.pdf, Nov. 22, 2012, 6 pagews.
Li et al., "Super-Resolution Imaging with Mid-IR Photothermal Microscopy on the Single Particle Level," SPIE Proceedings vol. 9549, 954912-1, 2015.
Sullenberger et al., "Spatially-Resolved Individual Particle Spectroscopy Using Photothermal Modulation of Mie Scattering," Massachusetts Institute of Technology, vol. 42, No. 2, Jan. 15, 2017, pp. 203-206.
Jiang et al., "Narrow-Linewidth Megahertz-Repetition-Rate Optical Parametric Oscillator for High-Speed Flow and Combustion Diagnostics", Applied Optics, vol. 47, No. 1, 2008, pp. 64-71.
Jiang et al., "Compact High Power Mid-Infrared Optical Parametric Oscillator Pumped by a Gain-Switched Fiber Laser with Figure-of-h Pulse Shape," Optical Society of America, 2015, 6 pages.
Wang et al., "High-Power Terahertz Quantum Cascade Lasers with ~0.23 W in Continuous Wave Mode," AIP Advances, 2016, 6 pages.
Burghoff et al., "Terahertz Laser Frequency Combs," Nature Photonics, 2014, 10 pages.
Brandstetter et al., "High Power Terahertz Quantum Cascade Lasers with Symmetric Wafer Bonded Active Regions," Applied Physics Letters 103, 171113 (2013), 6 pages.
Tapos et al., "High Bandwidth Fast Steering Mirror," Optomechanics, 2005, 14 pages.
Gorgulu et al. "All-Silicon Ultra-Broadband Infrared Light Absorbers," Scientific Reports, 2016, 7 pages.
Jung et al., "Infrared Broadband Metasurface Absorber for Reducing the Thermal Mass of a Microbolometer," Scientific Reports, 2017, 8 pages.
Dowrey et al., Industrial Applications of Near-IR Imaging, Spectrochemical Analysis Using Infrared Multichannel Detectors, Blackwell Publishing, 2005, pp. 175-188.
Marcott et al., "Mining the Information Content Buried in Infrared and Near-Infrared Band Shapes by Temporal, Spatial, and Other Perturbations," Applied Spectroscopy, 2009, 9 pages.
Selmke et al., "Photothermal Single Particle Microscopy: Detection of a Nanolens," ACS Nano, 2012, 11 pages.
Webpage—Optotronics—https://www.optotronics.com/532nm-green-laser-systems.php, 2017, 2 pages.
PCT Application No. PCT/US2017/063810, Written Opinion dated Mar. 6, 2018, 14 pages.
Application and file history for U.S. Appl. No. 15/715,534, filed Sep. 26, 2017. Inventors: Zhang et al.
Application and file history for U.S. Appl. No. 15/917,210, filed Mar. 9, 2018. Inventors: Yang et al.
Application and file history for U.S. Appl. No. 16/155,089, filed Oct. 9, 2018. Inventors: Prater et al.
Bialkowski, "Application of the BaTiO3 Beam-Fanning Optical Limiter as an Adaptive Spatial Filter for Signal Enhancement in Pulsed Infrared Laser-Excited Photothermal Spectroscopy," Optics Letters, Sep. 1989, 3 pages.
Bialkowski, "Pulsed-Laser Excited Differential Photothermal Deflection Spectroscopy," Society for Applied Spectroscopy, 1992, 11 pages.
Bialkowski, "Ultrasensitive Photothermal Deflection Spectrometry Using an Analyzer Etalon," American Chemical Society, 1988, 6 pages.
Boyer et al., "Photothermal Imaging of Nanometer-Sized Metal Particles Among Scatters," Science, vol. 297, Aug. 2002, 4 pages.
Cariou et al., "Refractive-Index Variations with Temperature of PMMA and Polycarbonate," Applied Optics vol. 25, No. 3, 1986.
Grodecki et al., "Optical Absorption and Raman Scattering Studies of Few-Layer Epitaxial Graphene Grown on 4H-SiC Substrates," Acta Phys. Pol. A 116.5 (2009); 835-837 (Year 2009).
Harthcock et al., Applications of Transmittance and Reflectance Micro/FT-IR to Polymeric Materials, Analytical Services, vol. 40, Issue 2, 1986, pp. 210-214.
Harthcock et al., Imaging with Functional Group Maps Using Infrared Microspectroscopy, Analytical and Engineering Sciences, vol. 42, Issue 3, 1988, pp. 449-455.

(56) References Cited

OTHER PUBLICATIONS

Hemming et al., "A High Power Mid-IR ZGP Ring OPO," with over 30 W of optical power (DOI: 10.1364/CLEO_SI.2013.CW1B.7).
Inoue et al., "Realization of Dynamic Thermal Emission Control," Kyoto University, Jul. 2014, pp. 928-931.
Kluk et al., "A High-Bandwidth, High-Precision, Two-Axis Steering Mirror with Moving Iron Actuator," Mechanical Engineering Department, Massachusetts Institute of Technology, 2010, pp. 552-557.
Liu, "Differential Interference Contrast-Photothermal Microscopy in Nanospace: Impacts of Systematic Parameters," Journal of Microscopy, Mar. 2017, 9 pages.
Moscatelli, "Tiny Lenses for Miniaturer Devices," Scientific American, Dec. 2019, 1 page.
Peng et al., High-Power Mid-Infrared Tunable Optical Parametric Oscillator Based on 3-mm-Thick PPMgCLN[1], Institute of Applied Electronics, China Academy of Engineering Physics, 2012, pp.—87-90.
Zanuto, "Analsys of the Thermo-Reflectivity Coefficient Influence Using Photothermal Pump-Probe Techniques," Applied Spectroscopoy, 2016, 7 pages.
Zhao, "Heterogeneous and Cross-Distributed Metal Structure Hybridized with Mos2 as High-Performance Flexible SERS Substrate," School of Physics and Electronics, Sep. 2018, 13 pages.
Application and file history for U.S. Appl. No. 16/465,824, filed May 31, 2019. Inventors: Prater et al.
CN Patent Application No. 201780084916.1, First Office Action dated Mar. 20, 2020, 3 pages.
Winefordner et al., "Comparison of Calculated Detection Limits in Molecular Absorption, Molecular Luminescence, Raman, Molecular Ionization, and Photothermal Spectroscopy," Applied Spectroscopy, vol. 39, No. 3, 1985, 15 pages.
Callaway, "It Opens up a Whole New Universe: Revolutionary Microscopy Technique See Individual Atoms for First Time," Nature, vol. 582, Jun. 11, 2020, 2 pages.
Cho Pak et al., "Investigation of Standoff Explosives Detection Via Photothermal/Photoacoustic Interferometry," Chemical, Biological, Radiological, Nuclear, and Explosives Sensing XII, vol. 8018, No. 1, May 13, 2011, 15 pages.
Totachawattana et al. "Optimization of Mid-IR Photothermal Imaging for Tissue Analysis," Visual Communications and Image Processing, Aug. 26, 2015, 7 pages.
Nedosekin et al., "Photothermal Confocal Spectromicroscopy of Multiple Cellular Chromophores and Fluorophores," Biophysical Journal, Feb. 1, 2012, 10 pages.
Zhang et al., "Depth-Resolved Mid-Infrared Photothermal Imaging of Living Cells and Organisms with Submicrometer Spatial Resolution," Science Advances, Sep. 28, 2016, 8 pages.
EP Patent Application No. 17875919.7, Extended EP Search Report dated Jul. 30, 2020, 9 pages.
EP Patent Application No. 17875650.8, Supplementary Partial Search Report dated Jun. 8, 2020, 15 pages.
PCT Application No. PCT/US2017/053407, Search Report and Written Opinion dated Dec. 1, 2017, 12 pages.
Application and file history for U.S. Appl. No. 16/427,866. Inventors: Decker et al.
Application and file history for U.S. Appl. No. 14/748,430. Inventors: Furstenberg et al.
Application and file history for U.S. Appl. No. 16/702,094. Inventors: Prater et al.

* cited by examiner

METHOD AND APPARATUS FOR SUB-DIFFRACTION INFRARED IMAGING AND SPECTROSCOPY AND COMPLEMENTARY TECHNIQUES

RELATED APPLICATION

The present application claims the benefit of U.S. Provisional Application No. 62/427,671 filed Nov. 29, 2016, which is hereby incorporated herein in its entirety by reference.

AFM-IR may be a useful technique for measuring and mapping optical properties/material composition of some surfaces with resolution approaching nanometer scale. Various aspects of the technique are described in U.S. Pat. Nos. 8,869,602, 8,680,457, 8,402,819, 8,001,830, 9,134,341, 8,646,319, 8,242,448, and U.S. patent application Ser. No. 13/135,956, by common inventors and commonly owned with this application. These applications are incorporated by reference in their entirety.

BRIEF DESCRIPTION OF THE DRAWINGS

Aspects and advantages of the embodiments provided herein are described with reference to the following detailed description in conjunction with the accompanying drawings.

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Definitions

Interacting a probe with a sample" refers to bringing the probe tip close enough to the surface of a sample such that one or more near field interactions occur, for example the attractive and/or repulsive tip-sample forces, and/or the generation and/or amplification of radiation scattered from an area of the sample in proximity of the probe apex. The interaction can be contact mode, intermittent contact/tapping mode, non-contact mode, pulsed force mode, and/or any lateral modulation mode. The interaction can be constant or as in preferred embodiments, periodic. The periodic interaction may be sinusoidal or any arbitrary periodic waveform. Pulsed force modes and/or fast force curve techniques may also be used to periodically bring the probe to a desired level of interaction with a sample, followed by a hold period, and then a subsequent probe retraction.

"Illuminating" means to direct radiation at an object, for example a surface of a sample, the probe tip, and/or the region of probe-sample interaction. Illumination may preferably include radiation in the infrared wavelength range, but other wavelengths may also be used. Illumination may include any arbitrary configuration of radiation sources, pulse generators, modulator, reflecting elements, focusing elements and any other beam steering or conditioning elements.

"Infrared source" and "source of infrared radiation" refer to one or more optical sources that generates or emits radiation in the infrared wavelength range, generally between 2-25 microns. The radiation source may be one of a large number of sources, including thermal or Globar sources, supercontinuum laser sources, frequency combs, difference frequency generators, sum frequency generators, harmonic generators, optical parametric oscillators (OPOs), optical parametric generators (OPGs), quantum cascade lasers (QCLs), nanosecond, picosecond, femtosecond and attosecond laser systems, CO2 lasers, heated cantilever probes or other microscopic heaters, and/or any other source that produces a beam of radiation. The source emits infrared radiation in a preferred embodiment, but it can instead or also emit in other wavelength ranges, for example from ultraviolet to THz. The source may be narrowband, for example with a spectral width of <10 $cm^{-1}$ or <1 $cm^{-1}$ less, or may be broadband, for example with a spectral width of >10 $cm^{-1}$, >100 $cm^{-1}$ or greater than 500 $cm^{-1}$.

"UV/vis source" refers to a source of ultraviolet (UV) and/or visible light radiation. The UV/vis source may comprise a gas laser, a laser diode, a superluminescent diode (SLD), a UV and/or visible laser beam generated via sum frequency or difference frequency generation, for example. It may also comprise any or other sources of UV and/or visible light that can be focused to a spot on the scale smaller than 2.5 micrometer, and preferably smaller than 1 micrometer.

"Spectrum" refers to a measurement of one or more properties of a sample as a function of wavelength or equivalently (and more commonly) as a function of wavenumber.

"Optical property" refers to an optical property of a sample, including but not limited to index of refraction, absorption coefficient, reflectivity, absorptivity, real and/or imaginary components of the index refraction, real and/or imaginary components of the sample dielectric function and/or any property that is mathematically derivable from one or more of these optical properties.

"Optical response" refers to the result of interaction of radiation with a sample. The optical response is related to one or more optical properties defined above. The optical response can be an absorption of radiation, a temperature increase, a thermal expansion, a photo-induced force, the reflection and/or scattering of light or other response of a material due to the interaction with radiation.

"Signal indicative of" refers to a signal that is mathematically related to a property of interest. The signal may be an analog signal, a digital signal, and/or one or more numbers stored in a computer or other digital electronics." The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

A "scanning probe microscope (SPM)" refers to a microscope where a sharp probe is interacted with a sample surface and then scanned the surface while measuring one or more properties of the sample surface. The scanning probe microscope may be an Atomic Force Microscope (AFM) which may include cantilever probe with a sharp tip. The SPM generally include a capability for measuring the motion, position and or other response of the probe tip and/or an object to which the probe tip is attached, e.g. a cantilever or a tuning fork or MEMS device, for example. The most common method includes using an optical lever system where a laser beam is bounced off the cantilever probe to measure deflection of the cantilever. Alternatives include self-sensing techniques like piezoresistive cantilevers, tuning forks, capacitive sensing and other techniques. Other detection systems may measure other properties such as force, force gradient, resonant frequency, temperature and/or other interactions with the surface or responses to the surface interaction.

Cantilever probes" are generally microfabricated cantilevers made from silicon, silicon nitride or other semiconductor based materials. Probes have also been fabricated from metals and polymeric materials. In general the probe only needs to have a sharp tip that can interact with the sample and support for some mechanism to detect the interaction, e.g. by the bending of the cantilever probe, or the change in resistance, resonance frequency or other property that is indicative of the interaction between the probe time and the sample.

A "scanner" is one or more scanning mechanisms used to generate relative translation between the probe and the sample so that the probe can interact with and measure properties of a plurality of positions on a sample. The scanning mechanism can move either the probe, the sample or a combination thereof. The scanning mechanisms are usually piezoelectric devices, but can also employ other mechanisms like electromagnetic, electrostatic, electrostrictive and other drive mechanisms that induce a desired motion in response to a given control signal or command. Scanners include, but are not limited to piezoelectric tubes, piezoelectric stacks, piezoelectric driven flexure stages, voice coils, and other mechanisms for providing precision translation.

An "SPM controller" refers to a system to facilitate data acquisition and control of the AFM-IR system. The controller may be a single integrated electronic enclosure or may comprise multiple distributed elements. The control elements may provide control for positioning and/or scanning of the probe tip and/or sample. They may also collect data about the probe deflection, motion or other response, provide control over the radiation source power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, or other circuit elements. A memory configured to store computer programs and may be implemented along with discrete circuit components to carry out one or more of the processes described herein.

A "lock-in amplifier" is a device and/or an algorithm that demodulates the response of a system at one of more reference frequencies. Lock-in amplifiers may be electronic assemblies that comprise analog electronics, digital electronics, and combinations of the two. They may also be computational algorithms implemented on digital electronic devices like microprocessors, field programmable gate arrays (FPGAs), digital signal processors, and personal computers. A lock-in amplifier can produce signals indicative of various metrics of an oscillatory system, including amplitude, phase, in phase (X) and quadrature (Y) components or any combination of the above. The lock-in amplifier in this context can also produce such measurements at both the reference frequencies, higher harmonics of the reference frequencies, and/or sideband frequencies of the reference frequencies.

"Photothermal distortion" refers to a change in the properties of a sample due to absorption of optical energy, for example the absorption of IR radiation. The photothermal distortion may refer to a change in index of refraction, reflectivity, thermal expansion, surface distortion, or other effects that can be detected with the tip of an atomic force microscope and/or a beam of UV/visible radiation.

Photothermal Imaging and Spectroscopy

Figure 1:
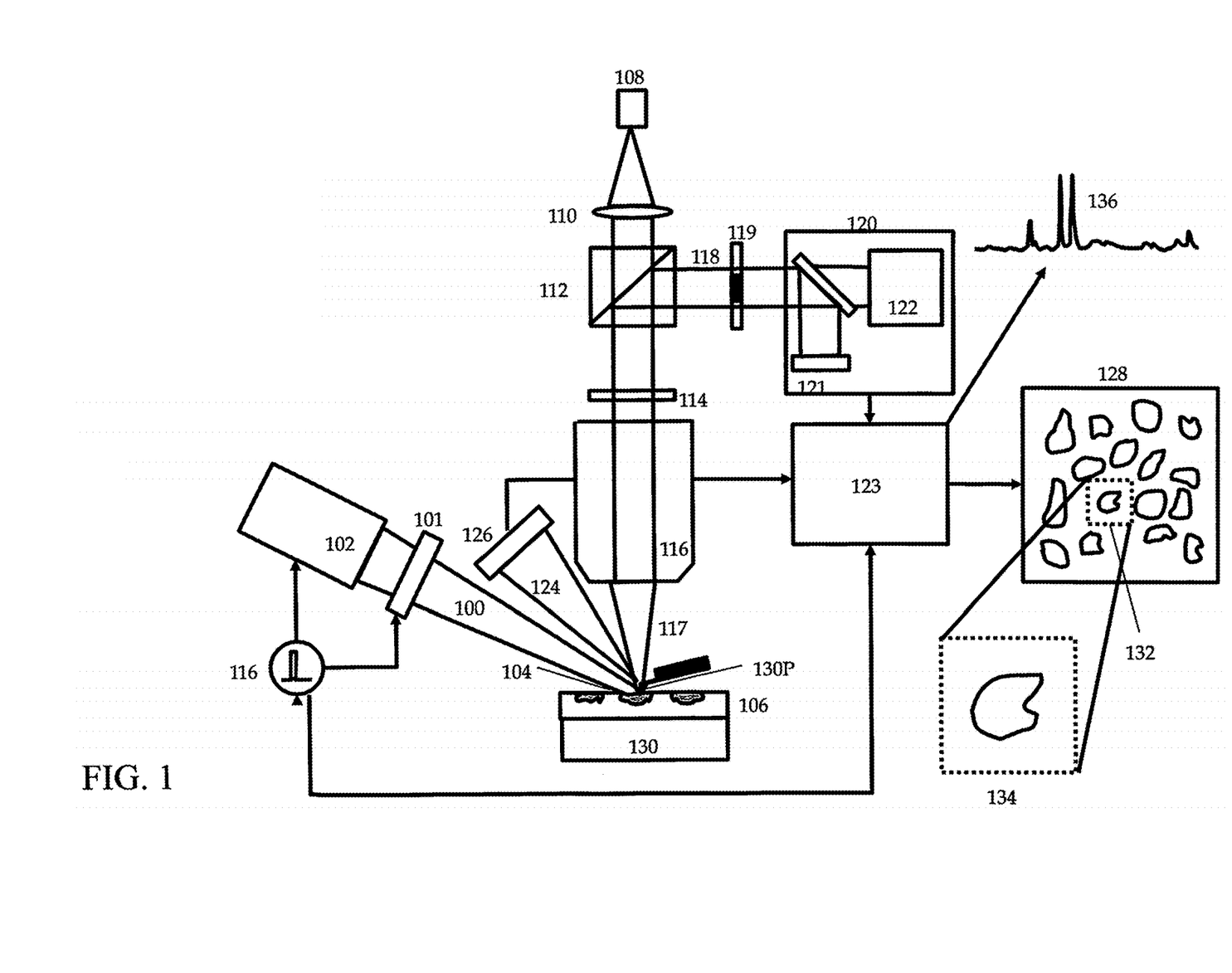
FIG. 1 shows a simplified schematic diagram of an illustrative embodiment.

FIG. 1 shows an embodiment of system for rapid photothermal infrared imaging and spectroscopy with sub-diffraction limited spatial resolution. A beam of infrared radiation 100 is directed from an infrared source 102 at a region 104 of a sample 106. The infrared source may be a tunable narrowband source, e.g. an infrared laser or a broadband source. If the beam 100 contains one or more wavelengths that are absorbed by material components in the illuminated region of the sample, the absorbed radiation will cause heating of the absorbing components. This absorbed heat can be detected in one of two ways. First, it can be detected with a focused beam of ultraviolet or visible (UV/vis) radiation. A source of UV/vis radiation 108 can be optionally collimated using one or more lenses 110 and then directed through a polarizing beamsplitter 112 to a quarter wave plate 114 and then focused by an objective 116 onto a portion of the region of the sample illuminated by the infrared radiation beam 100. The heating of absorbing regions of the sample can cause light reflected or more generally scattered from the sample surface to deviate from its normal trajectory without the sample being illuminated with infrared light. For example, the sample may deform due to thermal expansion causing changes in the reflection and/or refraction from the sample. Additionally, the sample or the surrounding medium can heat and change the local index of refraction of the sample. The resulting "thermal lensing" can alter the beam path of UV/vis light scattered, refracted or reflected from the sample. Light returning from the sample can be collected by objective 116 (or alternately an additional objective lens placed below the sample, not shown), and then sent to a receiver 120. In the case of collecting the light via the illuminating objective 116, the collected light can pass through the quarter waveplate 114 such that the polarization is rotated 90 degrees relative to the incident beam. Then polarizing beamsplitter 112 will direct the polarization rotated beam towards a receiver 120 that can comprise a detector 121 or spectrometer 122 or both. Optionally a portion of the beam 118 from the polarizing beam splitter may be blocked by filter 119. Filter 119 may have a central obstruction, for example to block the majority of undeflected central rays, thus increasing the dynamic range of the detector 121 and/or spectrometer 122. That is, the detector can be operated at higher gain and/or longer integration times before saturating if the central part of the undeviated beam is blocked. Alternately there can be an additional lens in the collection arm that focuses beam 118 to a spot either at or before the detector 121. In the case that the additional lens focuses the beam to a post before the detector, a pinhole may be placed at the focused spot to block light that is scattered or reflected from regions outside the sample focal plane. Detector 121 may be a detector that measures the relative intensity of the beam incident on it, for example a conventional photodiode, an avalanche photodiode, photomultiplier tube, and/or other detector that produces a signal that a signal indicative of an intensity of the light incident on the detector. Alternately, the detector 121 can be a position sensitive detector, for example a linear photodiode, a dual or quad segment detector or a multi-detector array. In this case, the detector can also be sensitive to positional shifts in the reflected/scattered beam, for example due to angular deviations in the beam and/or lateral shifts. Alternately detector 121 may comprise a phase sensitive detector, comprising further an interferometric detection scheme that produces a signal indicative of the optical phase or optical phase shift of the beam incident on the detector. In these embodiments the system can measure the change in intensity, beam angle and/or optical retardation induced by a temperature change in the sample due to the interaction or absorption of infrared light by the sample.

The infrared light source can be pulsed or modulated. For example controller 123 may generated trigger or sync pulses that command the light source to pulse at a specified rate. Alternately, the light source may pulse based on internal timing and send a sync pulse back to controller 123. Alternately, the light source may have an external modulator 101 that periodically modulates its intensity. In a preferred embodiment the light source is modulated or pulsed at frequencies in excess of 10 kHz, 100 kHz, or 1 MHz. Modulating the infrared light at high frequencies reduces the effective thermal diffusion length which could otherwise compromise the spatial resolution of this technique. The detected UV/vis light is then analyzed by controller 123 and/or external signal conditioning/demodulating electronics. In one embodiment the detector signal is analyzed by a lock-in amplifier or equivalent device to measure an amplitude of the UV/vis modulation at the modulation frequency of the laser light source or a harmonic frequency thereof. By using phase sensitive detection such as a lock-in amplifier it is possible to measure only the impact of the infrared light that is absorbed by the sample and causes a periodic deviation of the UV/vis beam resulting from the sample heating. By measuring the amplitude of the UV/vis modulation at plurality of locations on the sample 106, it is possible to make an image 128 of the infrared response of the sample. A key aspect of this arrangement is that the infrared properties of the sample can be measured on a scale below the diffraction limit of the infrared light source that illuminates the sample. Instead, the spatial resolution is limited only by the spatial resolution limit of the illuminating UV/vis light beam. This spatial resolution can be as low as $\lambda/2$, where $\lambda$ is the wavelength of the UV/vis light beam. The UV/vis modulation can also be measured as a function of the wavelength of the infrared source 102 to create a spectrum 136 of the IR absorption, reflection and/or transmission of the sample. In the case of a narrowband source, e.g. a source with a spectral linewidth of typically <10 $cm^{-1}$ and preferably <1 $cm^{-1}$ it is possible to create a spectrum directly by measuring the UV/vis modulation as a function of the emission wavelength (or equivalently wavenumber) of the infrared source. In the case of a broadband source (typical linewidth >100 $cm^{-1}$), it may be desirable to use Fourier transform techniques to extract the wavelength dependence of the UV/vis modulation and thus extract spectrum 136. In this case the light from IR source 102 is passed through an interferometer comprising a beamsplitter, a fixed mirror and a moving mirror, before the light is incident on the sample. The moving mirror in the interferometer can be scanned over a range of different positions while monitoring the UV/vis modulation to create an interferogram. The interferogram can then be Fourier transformed to obtain a spectrum.

The spatially resolved map 128 can be created in two main ways. First, the focused IR and uv/VIS light spots can be held stationary and the sample 106 can be scanned relative to these focused spots, for example with sample scanner 130. Alternately, the UV/vis light beam may be scanned across the sample, for example using galvo scanning mirrors as employed in laser scanning confocal microscopy. Note that it is possible for the IR light beam 100 to be either stationary or scanned depending on the power requirements and the focused spot size. In one embodiment the IR beam 100 is synchronously scanned with the UV/vis spot such that the peak intensity of the IR beam and the center of the UV/vis spot are substantially overlapped. Alternately, the IR beam can be configured to be large enough such that it covers the range of travel of the scanned UV/vis beam. In one embodiment the IR source can be a thermal source, for example a globar as conventionally used in Fourier Transform Infrared (FTIR) spectroscopy and microscopy. Alternately small area thermal emitters for example from Axetris or NovaIR or other vendors can be employed. In the case of a thermal emitter it is desirable to modulate the temperature of the device or the output IR power. Some commercial small area thermal emitters can be modulated up to the 100 Hz regime. AFM cantilevers with integral resistive heaters can be modulated in the kHz range due to their small active area and small thermal time constant. Susuma Noda and colleagues at the University of Kyoto have fabricated thermal emitters that can be modulated at frequencies in the range of 10 kHz (doi:10.1038/nmat4043). Various external modulators can also be employed, for example photoelastic modulators, high speed choppers (for example from Scitec up to 100 kHz), MEMS mirrors, piezoelectrically deformed mirrors and other modulators that can adjust the intensity, angle, and/or focused spot size of an infrared beam.

A desirable aspect of the device of FIG. 1 is that it can be used to perform both infrared photothermal optical microscopy and scanning probe microscopy measurements on the same platform. This can be achieved without having to manually move the sample from one instrument to another and thus can support collocated, sequential, and even in some cases simultaneous measurements.

In one embodiment the UV/vis source may comprise a superluminescent diode (SLD). SLDs can be advantageous in this apparatus as they have relatively short coherence lengths. Conventional lasers and laser diodes can have coherences lengths in the meter and millimeter range. This can cause a problem as a light source for optical photothermal measurements since scattered light and multiply reflected light can self-interfere causing unwanted parasitic oscillations in the measurement in the absorption of IR light with the UV-vis beam. For this reason in one embodiment a superluminescent diode is chosen as the UV-vis source. For example Exalos makes superluminescent diodes with spatial coherence in the range of 4-30 μm. These short coherence lengths mean that multiple reflections that occur from surfaces or scatterers roughly more than the coherence length away in distance will not strongly self interfere, thus resulting in optical photothermal images with fewer interference artifacts. Qphotonics sells a 405 nm superluminescent diode coupled to a single mode fiber with a 3.6 um mode diameter. Using a high NA and low aberration objective along with an appropriate tube lens it is possible to focus light from the single mode fiber to a near diffraction limited spot, thus achieving high spatial resolution but without the optical interference issues associated with a narrowband source.

In one embodiment the image 128 created by using the UV/vis beam to read out IR absorption can also be used as a "survey scan" for a higher resolution measurement performed by atomic force microscope based infrared spectroscopy (AFM-IR) or scattering-scanning nearfield optical microscopy (s-SNOM) or tip-enhanced Raman spectroscopy (TERS) or any other probe-based microscope scan, or for laser based mass spectrometry, as described later. In the AFM-IR technique the sample 106 is also illuminated by a beam 100 of infrared radiation from an IR source 102. In this case if a portion of the illuminated region absorbs infrared light, the absorbing region can heat up and undergo thermal expansion, creating a force impulse on a probe tip 130P of the AFM. Alternately IR radiation interacting with the sample may induce a force between the tip and sample due to induced electric field interactions. In either case the force on the probe tip can cause a bending of the probe that can be detected optically or by other means. In one embodiment it is possible to employ the same UV/vis laser system used to read out the IR absorption as described above. In this case the laser scanning mechanism (e.g. galvos) can be used to move the UV/vis laser beam from a region on the sample to the back of the cantilever. In one embodiment the cantilever tilt angle and the numerical aperture of the objective lens 116 are selected such that the light reflected off the AFM cantilever is reflected at an angle outside the collection angle of the objective 116. For example a Mitutoyo 20× 0.42 NA long working distance objective can be used to both focus the UV/vis laser spot on the cantilever or sample while still providing sufficient clearance for the AFM deflection measurement outside the collection angle of the lens. The 20× 0.42 NA objective has a half angle of roughly 25°. So if the cantilever is tilted at 25 degrees or more, the beam 124 reflected from the cantilever will pass outside the collection angle of objective 116 and can be collected by position sensitive detector 126. Despite this long working distance, the 20× 0.42 NA objective can still focus the UV/vis beam to a spot smaller than 1 micron in diameter with light sources 108 up to around 670 nm wavelength and with an M2 beam quality of 1.2 or better. Similarly a 10× 0.24 NA 38 mm working distance objective can be used. This objective can also achieve focused spot diameter just below 1 um with 408 nm wavelength or shorter source. It has the advantage of a smaller collection angle of 14 degrees which requires a cantilever tilt of only 7 degrees or more to have the reflected beam outside the collection angle of the optics.

With a combined system that include UV/vis and AFM-IR mapping of the IR absorption it is possible to have both rapid large area mapping and extremely high spatial resolution IR mapping. For example a large region can be scanned rapidly using the UV/vis beam to acquire a survey scan 128 with spatial resolution on scale from 0.2-1 μm. Then a smaller region of interest 132 can be identified in the survey scan 128. The smaller region 132 can then be measured by AFM-IR to obtain a high resolution image 134 with a spatial resolution down to the nanometer scale.

Advantageously the receiver 120 that collects the radiation reflected/scattered from the sample surface may be a detector 121 or a spectrometer 122 or a combination thereof. In one embodiment the spectrometer 122 comprises a Raman spectrometer. Because the sample illuminating beam is preferably in the UV or visible wavelengths (or alternately shortwave IR, e.g. 1064 nm), it can also be used to excite Raman response in the sample. In this case the back scattered/reflected light can be analyzed by a Raman spectrometer for Raman shifted photons. In this way it is possible for the same instrument to collect both infrared and Raman spectra of the same sample and with sub-micron spatial resolution for both measurements.

Figure 2:
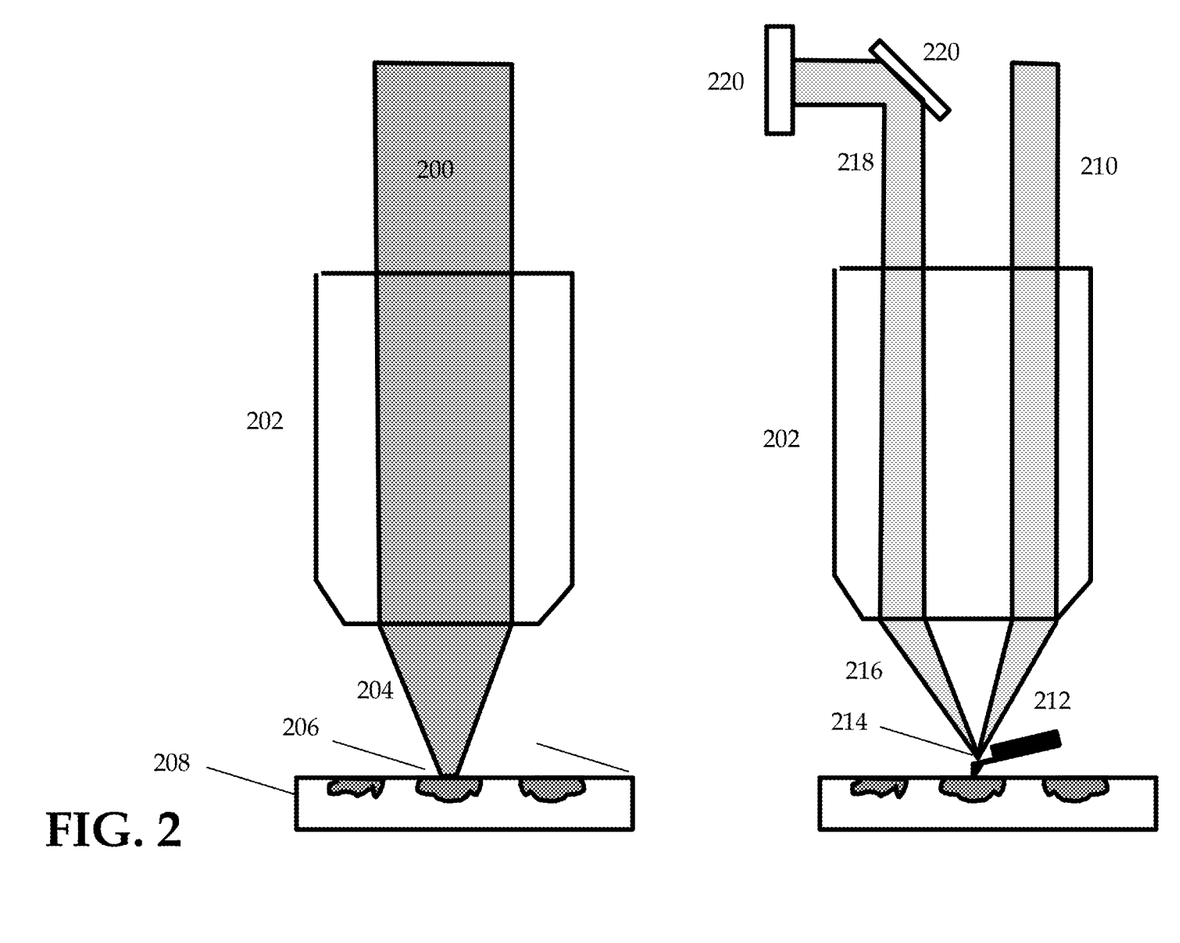
FIG. 2 shows shuttling of IR beam between AFM and photothermal.

FIG. 2 illustrates an optical arrangement under one embodiment that supports both optical photothermal and AFM-based measurements using the same objective lens. FIG. 2A shows one arrangement for optical photothermal measurements. UV/vis light 200 passes through objective 202 where it is focused 204 onto a region 206 of sample 208. Scattered and/or reflected light is passed back up through the objective and detected and analyzed per the methods described in the text associated with FIG. 1. FIG. 2B shows an arrangement for AFM based measurements. In this case a light beam 210 is directed off the center of the optical axis of objective 202. For example the beam 210 may be position near the outside diameter of the input aperture of the objective 202. When the beam 212 exits the objective 202 it is directed to strike prove 214, for example an AFM cantilever probe. Reflected beam 216 is directed on an alternate optical path than the incoming beams 210/212 and exit the objective on a parallel but offset path 218. The offset thus makes it possible to easily separate the incoming and outgoing beams and direct outgoing beam 218, for example using mirror 220 to direct the reflected beam to a position sensitive detector 220 for measuring the deflection of probe 214.

Figure 3:
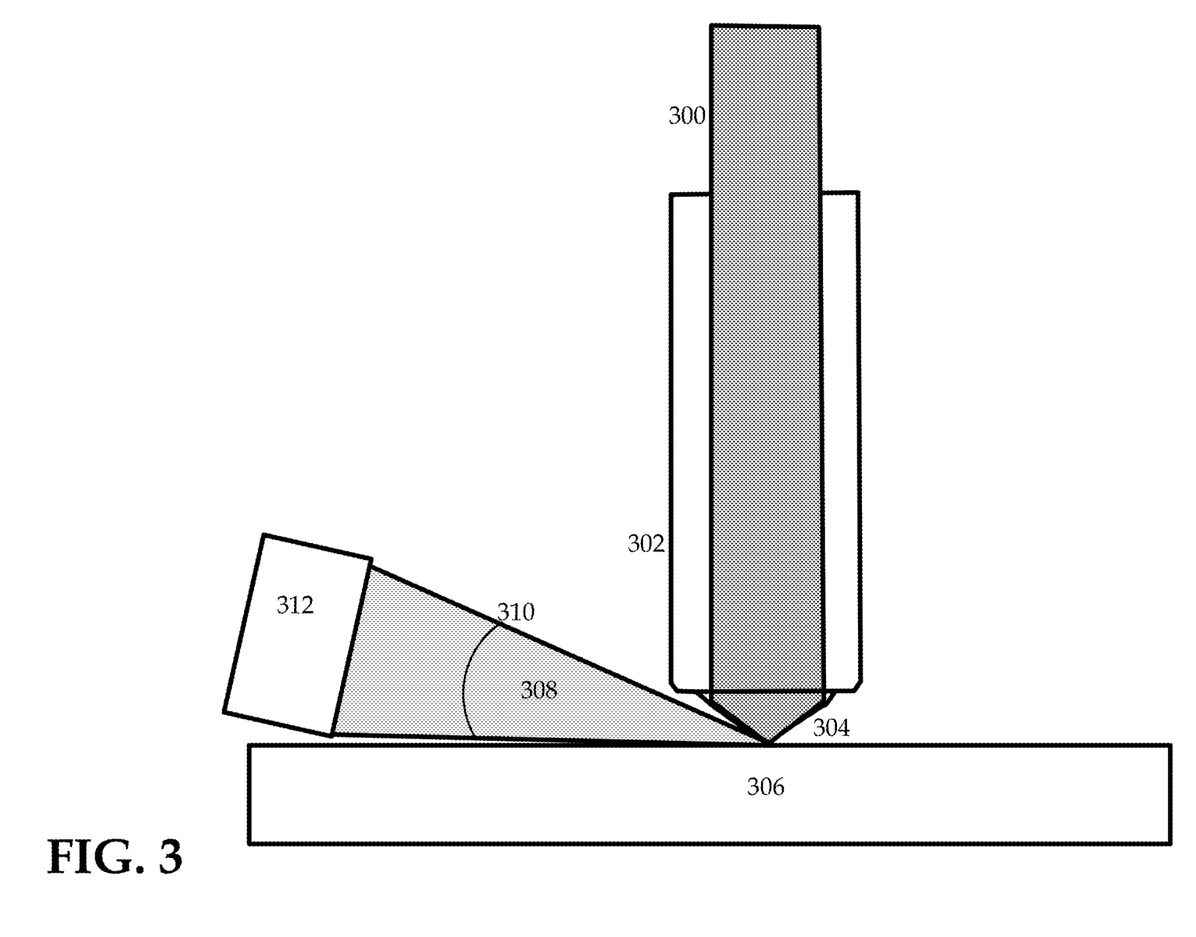
FIG. 3 shows shuttling between IR and Raman.

FIG. 3 shows an embodiment of the apparatus comprising top side, side-angle illumination of the sample with an IR beam and a high resolving power UV/vis readout. In this embodiment an IR light beam 308 is illuminates sample 306 with a low angle of illumination. The IR light beam 308 is focused to a spot on sample 306 using a focusing element 312 that can comprise one or more lenses and/or curved mirrors. In one embodiment the focusing element 312 can be a parabolic mirror, for example an off axis parabolic mirror. UV/visible light beam 300 is directed through objective 302 to focus light 304 on a region of sample 306. The cone angle 310 of the IR beam 308 can be chosen such that it can fit under the working distance and angular clearance of object 302. For example objective 302 can be a 100× 0.7 NA objective from Mitutoyo with a 6 mm working distance. This working distance and the objective's housing provide support for an IR illumination cone angle of at roughly 32 degrees, corresponding to an illumination NA of 0.28 and a 16 degree angle of incidence. This illumination NA can be more than sufficient to focus the IR radiation 308 to a small enough spot to obtain the intensity at the sample required for optical photothermal detection. To achieve high spatial resolution, only the UV/vis beam needs to be tightly focused. The IR beam may be focused to a much larger spot, as long as the focused spot has sufficient intensity to generate a detectable deflection in the visible beam. Smaller IR illumination angles can also be used, for example to provide more clearance between the IR beam 308 (and focusing element 312) and the sample 306.

Figure 4:
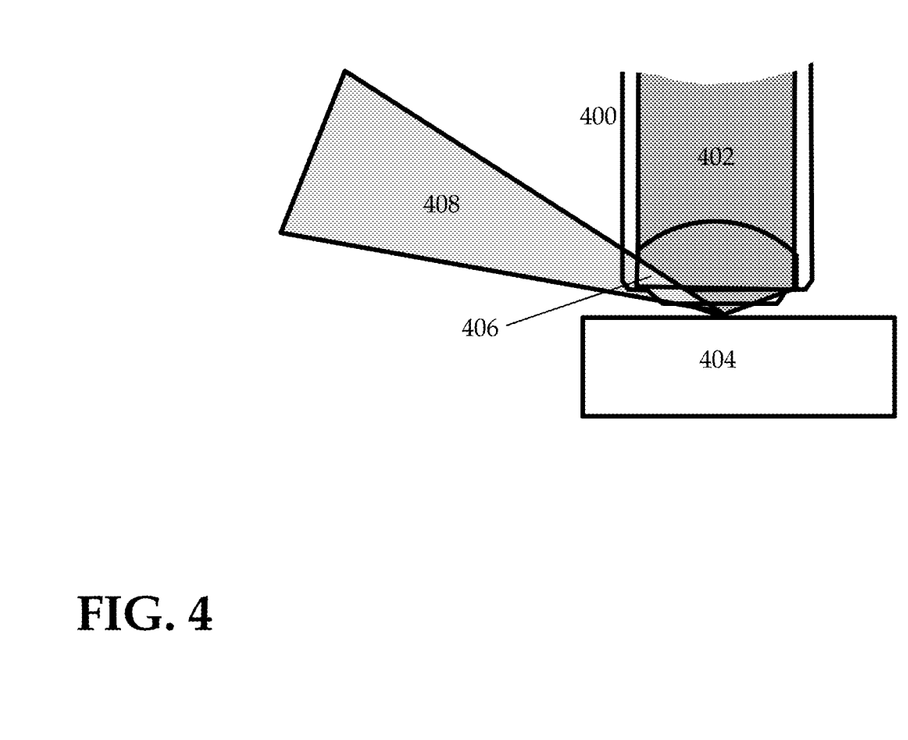
FIG. 4 illustrates using same objective for AFM as for UV/vis light collection.

In cases where it is desired to use higher NA focusing optics for the UV/vis beam it is possible to achieve side angle illumination using a specially modified objective. FIG. 4 shows an embodiment involving a high NA objective 400 and side angle illumination with IR beam 406. In this case the short working distance of standard high NA objectives may not provide adequate clearance for side angle illumination. For example objectives with NA of 0.85 or higher may have working distances of much less than 1 mm. In the case of extremely high NA UV/visible light objective, it is possible to create an illumination path for the IR light by creating a custom objective with a hole or other clearance for side illumination. For example it is possible to machine both the objective housing and if desired a small portion of the edge of the final objective lens. FIG. 4 shows a high NA objective 400 with a UV/vis beam 402 focused on sample 404. A portion 406 of objective 400 is cut away to provide access for side angle illumination by IR beam 408.

Figure 5:
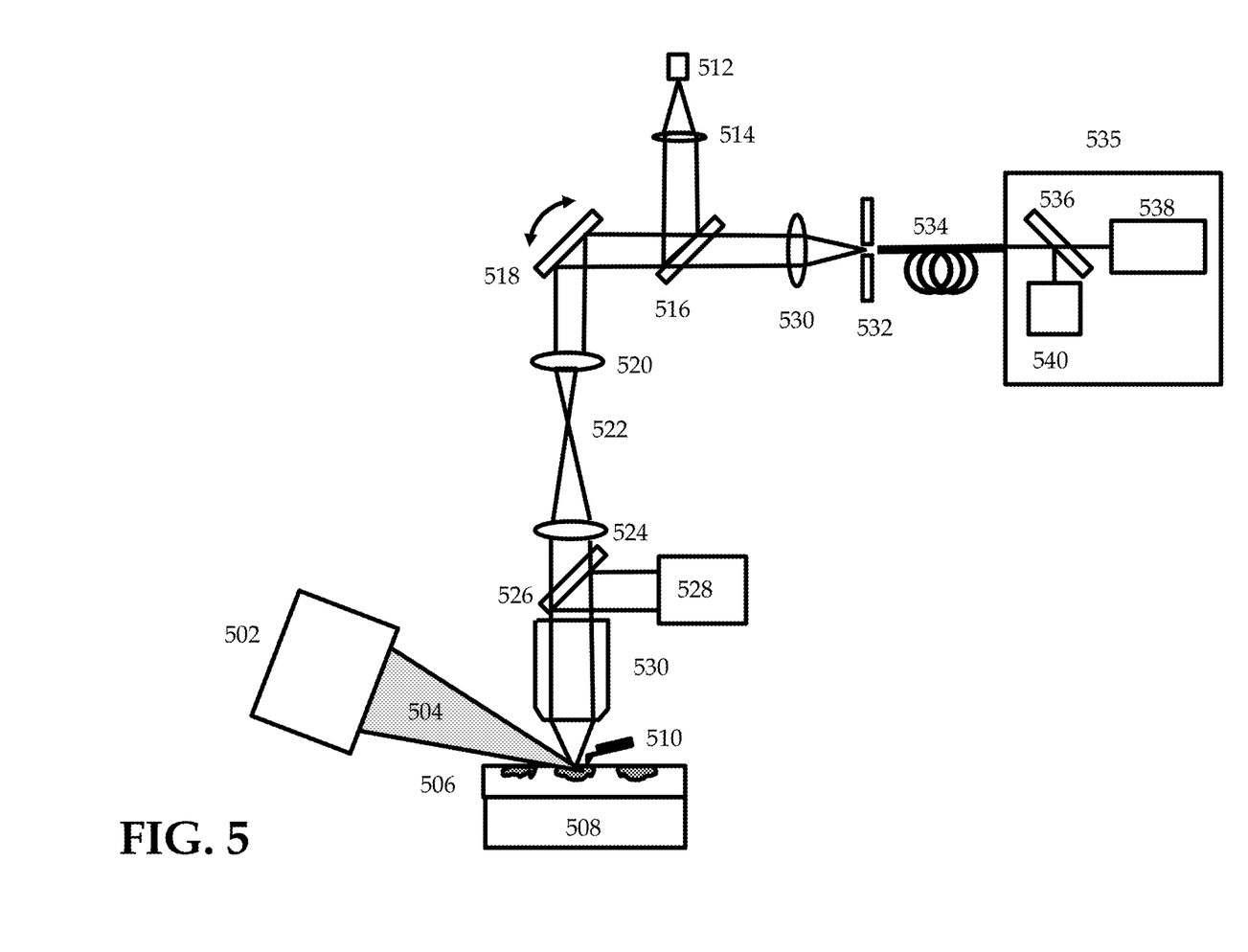
FIG. 5 illustrates an embodiment including laser scanning confocal microscopy and spectroscopy.

FIG. 5 shows an embodiment combining photothermal IR spectroscopy and laser scanning confocal microscopy/spectroscopy. An IR source 502 focuses a beam of IR radiation 504 onto sample 506. The sample can be scanned under the beam via scanner 508. Scanner 508 may be a piezo driven stage, a mechanical translation stage or a combination thereof, which can be a mechanical translation. The sample can also be measured by AFM probe 510 to measure both the topography and photothermal response of the sample. The sample 506 is also illuminated by a beam of UV, visible, or near IR light via light source 512. Light from light source 512 is collimated by lens 514 and then directed to beamsplitter or dichroic 516. A portion of the light is optionally directed towards scan mirrors 518, typically a pair of galvo-based steering mirrors. Light reflected off the galvo scan mirrors can be focused by scan lens 520 to produce an intermediate focus at 522. Tube lens 524 in combination with objective 530 transfer an image of the intermediate focus 522 to a position on sample 506. As the galvo scan mirrors 518 move, the position of the focused spot on the sample can translate across the sample. If the focus spot of beam 504 is large relative to the scan range provided by the scan mirrors 518, the IR focused spot can remain stationary and the scan mirrors 518 can rapidly map the photothermal response of the sample. Light reflected and/or scattered from the sample 506 is recaptured by objective 530 and retraces the incident light path. An optional beamsplitter/dichroic or removable mirror 526 can be used to provide an auxiliary optical access for white light illumination and/or a camera view of the sample from peripheral device 528. Light that passes through or by beamsplitter/mirror 526 continues along the incident light path back to beamsplitter/dichroic 516. In this case we consider now the light that passes through the beamsplitter/dichroic 516 which then goes to an optional focus lens 530 which focuses the light to a spot on a confocal aperture or pinhole. This pinhole allows light to pass through that is confocal with the sample focal plane and blocks out of focus light. The aperture at this location may be an adjustable aperture, or have multiple selectable pinholes of various sizes to allow for appropriate tradeoffs between signal and depth of focus. Light passing through the pinhole 532 can be coupled to a fiber 534 or go directly to a detector/spectrometer assembly 535. The detector/spectrometer 535 may include a mirror/dichroic/beamsplitter 536 to divide or direct the collected light along paths to either or both of a UV/visible light detector 540 or spectrometer 538. For example 536 can be a rotatable or flipper mirror to direct the light to either a detector 540 or a spectrometer 538 or 536 can be a beam splitter to divide the light between the two paths. In one embodiment, spectrometer 538 is a Raman spectrometer, thus allowing the system to perform complementary measurements of both IR spectroscopy and Raman spectroscopy on the same sample and even at the same time if desired. In the case of using a spectrometer it is possible that beamsplitter 536 is a dichroic that reflects or transmits the excitation wavelength while doing the opposite for Raman shifted light. In this way the light can be divided by wavelength and separately analyzed to make photothermal IR absorption measurements at the excitation wavelength of source 512 and Raman spectroscopic measurements with wavelength shifted light at spectrometer 538.

Figure 6:
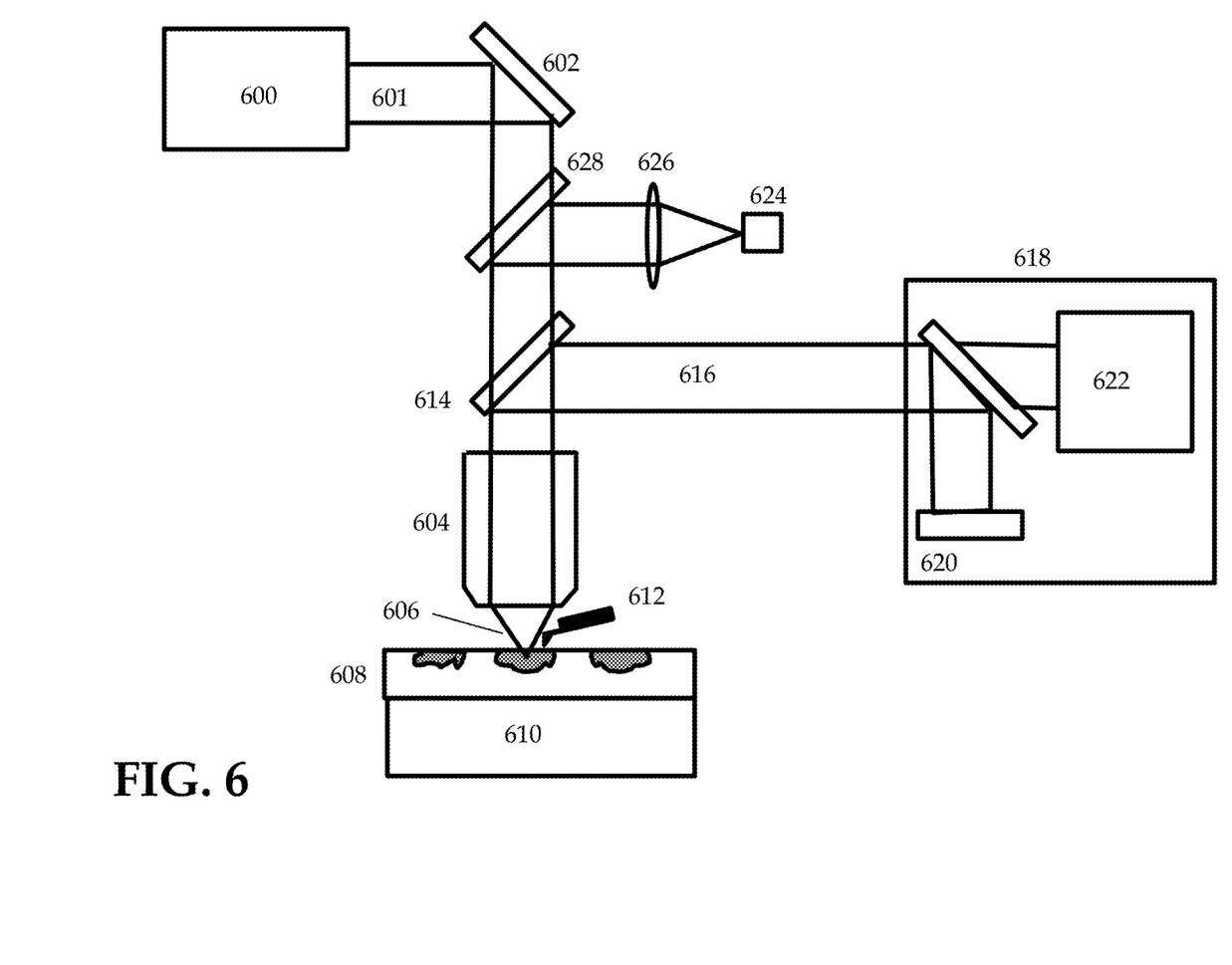
FIG. 6 shows an embodiment related to that shown in FIG. 2 in which the IR and UV/vis light are focused with the same objective lens.

FIG. 6 shows an embodiment related to that shown in FIG. 2 in which the IR and UV/vis light are focused with the same objective lens. IR light source 600 emits a beam 601 of IR radiation towards optional mirror 602 which reflects the beam towards objective 604 where it is focused 606 to a spot on sample 608. Objective 604 is preferably a reflective objective, for example a Cassegrain/Schwarzschild objective such that it can focus both UV/Vis and IR light at the same point in space. Objective 604 may also be a refractive objective, for example with lenses made of an IR transparent material, for example ZnSe. IR light absorbed by sample 608 causes a temperature increase in the sample resulting in a photothermal distortion in the sample, for example a change in index of refraction, change in reflectivity and/or change in surface deformation. UV/vis light source 624 is collimated by lens 626 and reflected by dichroic mirror or beamsplitter 628 through the same objective 604 and is focused onto substantially the same region of the sample where the IR light beam is focused. Temperature increases in the sample and resulting photothermal distortions of the sample can cause a change in the intensity, angle and/or optical phase of the reflected/scattered visible light from source 626. The scattered/reflected UV/vis light is collected by objective 604 and passed up to dichroic mirror/beamsplitter 614 where it is directed to receiver 618. Receiver 618 can comprise a UV/vis detector 620 and/or a spectrometer 622, as described previously with respect to FIGS. 1 and 5. The sample 608 can be scanned under the focused UV/vis and IR spots with scanner 610 to provide a map of the IR absorption of the sample. The wavelength of IR source 600 can be swept to obtain spectroscopic measurements of the sample 608. The scanner 610 can comprise a large travel (mm to cm scale) mechanical stage for coarse imaging and a piezo stage for fine imaging either by the UV/vis photothermal measurement or using AFM probe 612 to read out forces on the AFM probe induced by the IR radiation incident on the samples.

Figure 7:
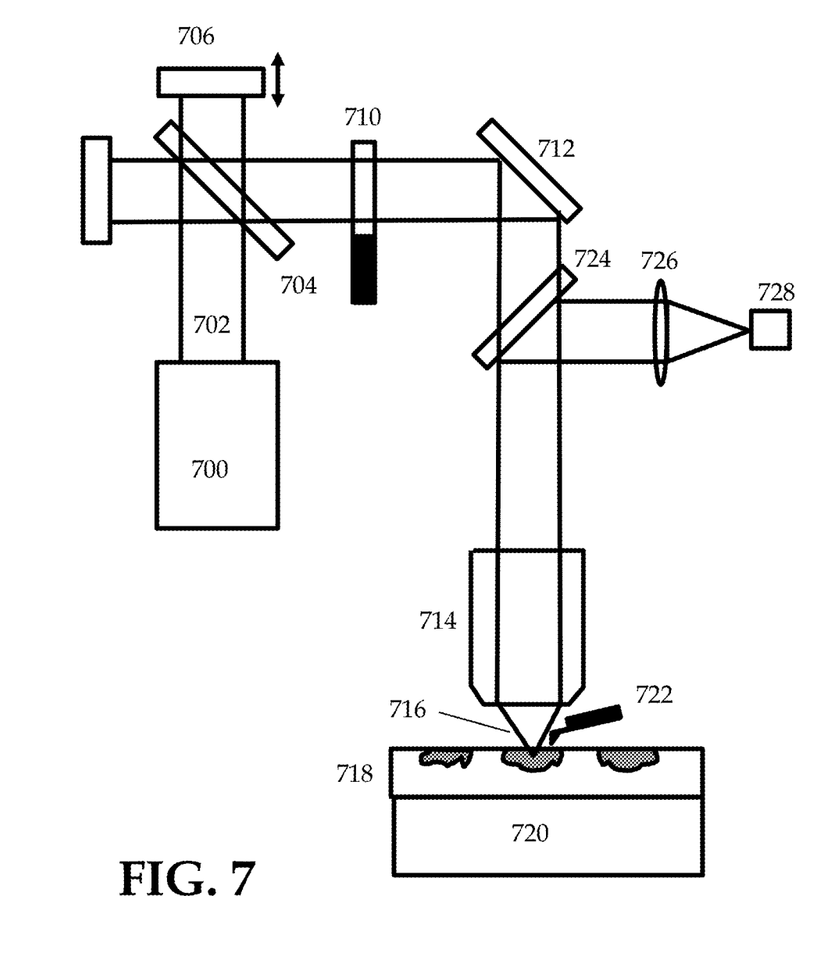
FIG. 7 shows an embodiment where the IR source is a broadband source.

FIG. 7 shows an embodiment where the IR source is a broadband source, for example a globar or other thermal source. Broadband IR source 700 emits a beam of radiation 702 comprising a plurality of wavelengths, preferably comprising a broad range of wavelengths for example $2.5^{-10}$ microns or more in wavelength range. The broadband IR beam 702 is directed towards beamsplitter 704 where the beam is divided into two paths. On one path the broadband IR light strikes fixed mirror 708 and on the other path it strikes moving mirror 706. The two beams recombine with a relative phase shift determined by the position of moving mirror 706. The combined beams are then directed through or onto optional modulator 710 that modulates the intensity and/or angle of the IR beam. An optional beamsplitter/dichroic or removable mirror 724 and lens 726 can be used to provide an auxiliary optical access for white light illumination and/or a camera view of the sample from peripheral device 728. The modulated beam is reflected off optional mirror 712 and directed through objective 714 where it is focused 716 on a sample 718. IR light that is absorbed by the sample creates a photothermal distortion that is read out by either an AFM probe 722 or a UV/visible light beam as discussed previously. In the case of read out by the AFM probe, the modulation frequency of modulator 710 can be set to substantially correspond with a resonance frequency of probe 722. In this configuration, the detection of the photothermal deflection of the AFM cantilever is amplified by the quality factor of the cantilever resonance. This resonant amplification allows the use of a thermal source (i.e. globar) which has much lower cost and much lower brilliance than an IR laser. The modulator 710 can also be used to create a modulation in the excitation that can then be used for lock-in detection of the UV-vis light intensity. The modulator frequency can also be set to correspond to a resonant frequency of a resonant amplifier, for example as described by United States Patent Application 20140361150.

Figure 8:
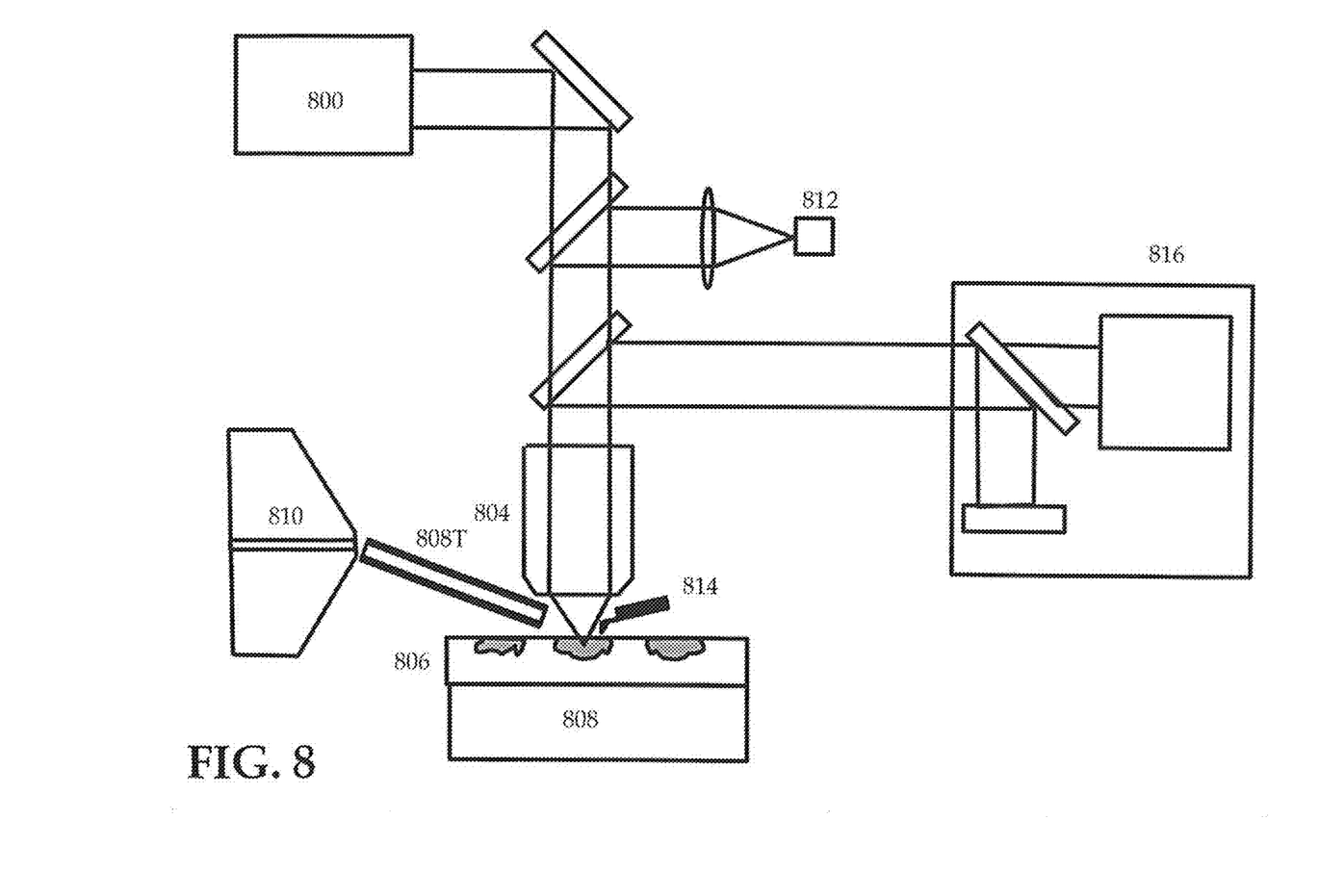
FIG. 8 shows an embodiment including mass spectrometry.

The current apparatus can also be combined with mass spectrometry as shown in FIG. 8. In this case the IR laser and/or the UV/vis source can be used to thermally desorb material from a sample and then the desorbed material may be analyzed in a mass spectrometer. In FIG. 8, light from IR source 800 or UV/vis source 812 can be focused onto sample 806 with objective 804. The focused intensity of the selected laser source is set to be sufficient to desorb and/or vaporize material from the sample 806. At least a portion of the desorbed plume is collected by collection tube 808T which then transfers the desorbed material to a mass spectrometer 810 for analysis. The mass spectrometer 810 can then analyze the chemical content of the desorbed material by creating a spectrum of the masses of desorbed molecules. The sample can be scanned under the desorbing beam by scanner 808 to create either an array of mass spectra or an image at a selected mass. As described previously, the IR beam in combination with the UV/vis readout can also measure IR and/or Raman spectra of the same region. Specifically, the IR light from source 800 is focused on the sample 806 and the resulting photothermal distortion can be read out with a UV/visible beam and/or by AFM probe 814. The UV/vis light is collected by objective 804 and directed to receiver 816 which can comprise a UV/vis detector, spectrometer or both, as described above. The UV/vis measurements of the photothermal distortion of the sample provides a very quick and efficient means to perform an IR survey scan of the sample to choose areas for analysis by thermal desorption mass spectrometry. Together this platform can provide any combination of AFM, IR spectroscopy, laser scanning confocal microscopy, Raman spectroscopy and mass spectrometry. Using variable wavelength or broadband UV/visible sources it is also possible to perform UV/vis spectroscopy as well.

Figure 9:
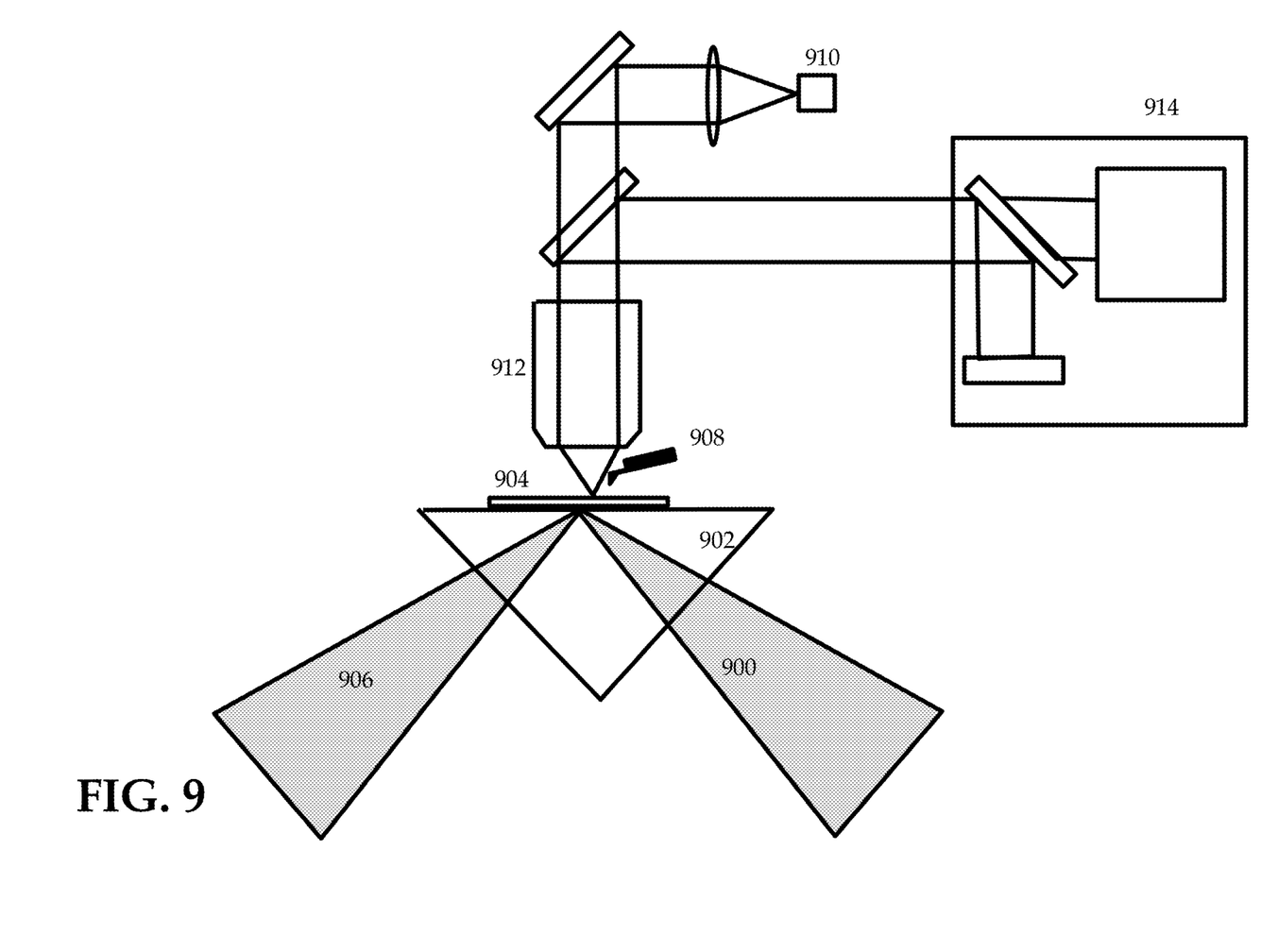
FIG. 9 shows an embodiment employing total internal reflection illumination of the infrared radiation.

FIG. 9 shows an embodiment employing total internal reflection illumination of the infrared radiation. A beam of IR radiation 900 is focused to pass through an infrared transparent substrate 902, for example a prism. A sample 904 is mounted or deposited on the prism 902. The illumination angle of beam 900 is chosen to provide total internal reflection at the upper surface of the prism 902. In this case the sample may be illuminated only when the index of refraction is sufficient to allow transmission into the sample or by evanescent fields that propagate into the sample. Reflected beam 906 can be analyzed by an IR detector to provide spectroscopic characterization of the sample down to the scale of a spatial resolution limited by diffraction limit of the incoming beam 900. Sub-diffraction limited measurements of IR absorption can be made using a probe of a probe microscope 908 and/or a UV/visible beam from optical source 910, as described previously. The light from UV/vis source 910 is focused by objective 912 and reflected/scattered light can be collected by the same objective. At least a portion of the collected light is directed towards received 914 which can comprise a UV/vis detector, a spectrometer, or both. Because of the evanescent illumination, the IR beam can have a very limited penetration depth into the sample, providing improved surface sensitivity, specifically to the surface closest to the IR transparent prism 902.

The embodiments described herein are exemplary. Modifications, rearrangements, substitute processes, alternative elements, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events can be performed concurrently, rather than sequentially.

The various illustrative logical blocks, optical and SPM control elements, and method steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality.

Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

We claim:

1. An apparatus for rapidly characterizing a sample with infrared radiation on a submicron scale, the apparatus comprising:
   a source of infrared radiation configured to illuminate a sample with a beam of infrared radiation to create an infrared illuminated area;
   a source of ultraviolet-visible (UV-vis) radiation configured to illuminate at least a region of the infrared illuminated area of the sample with a beam of UV-vis light;
   an objective configured to focus the beam of infrared radiation to the submicron scale;
   a collector configured to collect as collected light at least a portion of the UV-vis light that is at least one of scattered, reflected and refracted from the sample;
   a receiver configured to analyze the collected light as indicative of an infrared absorption of the region of the infrared illuminated area; and
   a Raman spectrometer configured to analyze the collected light to analyze a Raman response of the sample.

2. The apparatus of claim 1, wherein the Raman response is used to construct at least one Raman spectrum from at least one region of the sample.

3. The apparatus of claim 1, wherein the receiver configured to analyze the infrared absorption and the Raman response substantially simultaneously.

4. The apparatus of claim 1, wherein the infrared absorption and the Raman response are determined at a sub-micron resolution.

5. An apparatus for rapidly characterizing a sample with infrared radiation on a submicron scale, the apparatus comprising:
   a broadband source of infrared radiation configured to illuminate a sample with a beam of infrared radiation to create an infrared illuminated area;
   an objective configured to focus the beam of infrared radiation to the submicron scale;
   a source of ultraviolet-visible (UV-vis) radiation configured to illuminate at least a region of the infrared illuminated area of the sample with a beam of UV-vis light;
   a collector configured to collect as collected light at least a portion of the UV-vis light that is at least one of scattered, reflected and refracted from the sample; and
   a receiver configured to analyze the collected light as indicative of infrared absorption of the region.

6. The apparatus of claim 5, wherein the broadband source comprises at least one of a globar and a thermal source.

7. The apparatus of claim 5, further comprising a modulator configured to modulate the beam of infrared radiation.

8. The apparatus of claim 7, wherein the modulator is configured to modulate the beam of infrared radiation at a frequency in excess of 10 kHz.

9. A method for rapidly characterizing a sample with infrared radiation on a submicron scale, the method comprising:
   illuminating a sample with a beam of infrared radiation to create an infrared illuminated area;
   focusing the beam of infrared radiation to the submicron scale with an objective;
   illuminating at least a region of the infrared illuminated area of the sample with a beam of ultraviolet-visible (UV-vis);
   collecting as collected light at least a portion of the UV-vis light that is at least one of scattered, refracted, and reflected from the sample;

analyzing the collected light to determine an infrared absorption of the region of the infrared illuminated area; and analyzing the collected light to detect a Raman response of the sample.

10. The method of claim 9, further comprising constructing at least one Raman spectrum from the Raman response.

11. The method of claim 9, further comprising analyzing the infrared absorption and the Raman response substantially simultaneously.

12. The apparatus of claim 9, wherein the infrared absorption and the Raman response are determined at a sub-micron resolution.

13. A method for rapidly characterizing a sample with infrared radiation on a submicron scale, the method comprising:

illuminating a sample with a beam of infrared radiation from a broadband source of infrared radiation to create an infrared illuminated area;

an objective configured to focus the beam of infrared radiation to the submicron scale;

illuminating at least a region of the infrared illuminated area of the sample with a beam of ultraviolet-visible (UV-vis) light;

collecting as collected light at least a portion of the UV-vis light that is at least one of scattered, refracted, and reflected from the sample;

analyzing the collected light to determine an infrared absorption of the region of the infrared illuminated area; and analyzing the collected light to detect a Raman response of the sample.

14. The method of claim 13, wherein the broadband source of infrared radiation comprises at least one of a globar and a thermal source.

15. The method of claim 13, further comprising modulating the beam of infrared radiation at a modulator.

16. The method of claim 15, wherein the modulator is configured to modulate the beam of infrared radiation at a frequency in excess of 10 kHz.

* * * * *